June 5, 1962 — A. BUSINGER — 3,037,711
METHOD OF AND INSTALLATION FOR PROCESSING
DROSS OF NON-FERROUS METALS
Filed June 12, 1958

INVENTOR.
ARTHUR BUSINGER
BY
Leon M. Strauss

United States Patent Office 3,037,711
Patented June 5, 1962

3,037,711
METHOD OF AND INSTALLATION FOR PROCESSING DROSS OF NON-FERROUS METALS
Arthur Businger, Niederglatt, Zurich, Switzerland, assignor to Metallwerke Refonda, Wiederkehr & Co., Niederglatt, Switzerland, a company of Switzerland
Filed June 12, 1958, Ser. No. 741,637
Claims priority, application Switzerland June 18, 1957
4 Claims. (Cl. 241—24)

The present invention relates to the processing of dross and more particularly to the processing of dross of non-ferrous metals.

For the purpose of processing the dross of non-ferrous metals it is necessary to crush and break the latter mechanically in order to remove non-melting portions such as iron, oxides, ashes, moulding sand and the like mechanically by cold process.

Crushing has hitherto been performed by employing edge mills for wet or dry processing, or drums containing balls, i.e. so-called ball mills. The dross has frequently been subjected to the action of these devices for hours. A number of separate operations requiring various devices are often necessary, particularly in edge-runner processing. These devices also have the disadvantage that they require charging and discharging which renders continuous operation with such machines impossible and causes the throughput to become comparatively moderate although large machines may be involved.

It is therefore an object of the present invention to provide means for the separation of dross into meltable and non-melting substances continuously and fully automatically.

A further object of the present invention is to provide for the continuous mechanical preparation and processing of non-ferrous dross, by separating non-metallic substances therefrom so as to enrich the metal content of the dross for reuse in melting.

Another object of the present invention is to provide for the processing of non-ferrous dross in a manner so as to avoid the loss of metallic components thereof and ensure a substantially improved yield in metal gained for reuse.

Still another object of the present invention is to provide for the processing of dross of non-ferrous metals by air separation of dust or fines therefrom after subjecting said dross to beating action, while removing said dust or fines from said air before the latter is permitted to escape to prevent contamination of the ambient atmosphere and to ensure that the fines in the form of oxides become available for reduction and reuse.

A further object of the present invention is the provision of means for the processing of dross including means permitting to crush the crude dross continuously in a beating operation.

Another object of the present invention is the provision of means facilitating the separation of finer particles and impurities from the crushed dross in a continuous processing of dross thus ensuring a high yield in metal for reuse in melting.

These and other objects of the invention will become more apparent from the following description when taken in connection with the accompanying drawing, in which.

Figure 1:
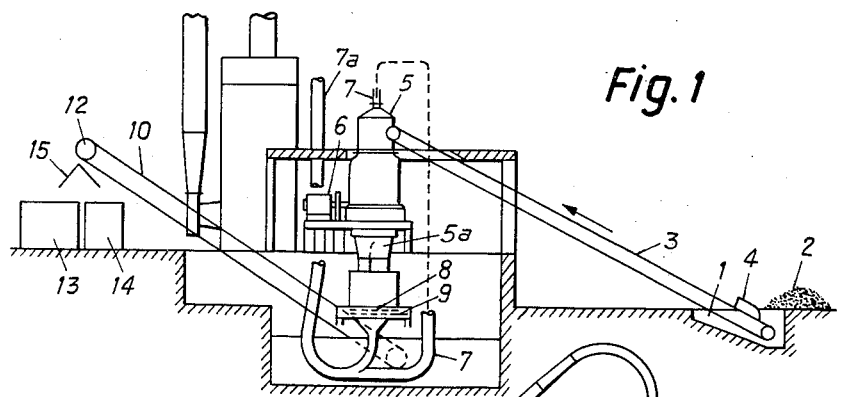
FIG. 1 is a front elevational view with parts in section of a plant for the processing of dross in accordance with the invention.
Figure 2:
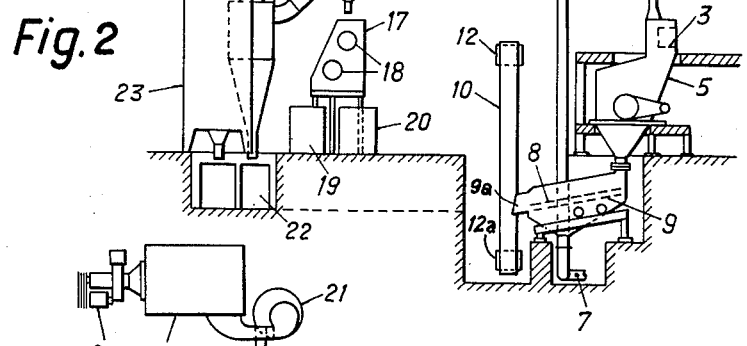
FIG. 2 is a side view of the plant shown in FIG. 1 with parts being shown in section.

Referring now specifically to the drawing it will be seen that the plant for processing dross of non-ferrous metals in accordance with the invention includes a beater mill 5 which is of conventional construction as employed for the crushing of stone, coal and other brittle material and operates continuously.

The coarse, unprocessed dross indicated at 2 in FIG. 1 is placed on an upwardly inclined conveyor band 3 having a feed member 4 and extending with one end into recess 1 below floor level. The conveyor band 3 supplies this dross to the beater mill 5 which is driven by a motor 6. For the purpose of removing dust which forms during the crushing of the dross, the housing of the beater mill has its top connected to an air suction line 7 serving to transport this dust. A discharging funnel 5a arranged at the bottom of the beater mill 5 opens on to an inclined sieve or step mesh formed, by way of example, by two mesh plates 8 and 9 arranged on top of one another. The top plate 8 is provided with holes having a diameter of about 6 mm. while the lower plate 9 has holes of 1 mm. diameter. Thus the dross crushed in the beater mill 5 into particles will be deposited on the mesh plates and thereby subjected to a sieving action. The top mesh 8 is designed solely to protect the lower mesh 9. The coarser particles dropping through the top mesh help, by their mesh cleaning action, to prevent the lower mesh from becoming clogged. All particles larger than 1 mm. slide into a sieve chute 9a, from where they drop to a conveyor belt 10 passing therebelow and supported by belt rollers 12 and 12a. The top belt roller 12 is designed as a magnet, and as the particles are transported over the latter, the particles having ferrous inclusions are attracted. The non-ferrous particles drop directly into the conveyor container 13 via the distributing chute 15, container and chute being arranged below top roller 12. The particles attracted by the magnet are dropped into the container 14. The meshes 8 and 9 may be replaced by a single-stage or multi-stage vibrating chute. From the particles discharged from the various stages, grain sizes of approximately 1 mm. and less may be removed by suction directly by means of the air current. The particles accumulating in the container 13 are available for new melting operations.

Figure 3:
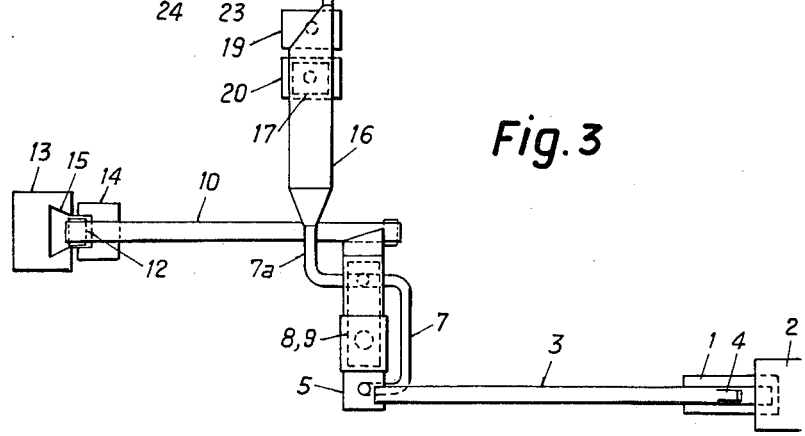
FIG. 3 is a plan view of the plant of FIG. 1.

The particles dropping through mesh 9 having holes of 1 mm. diameter are a mixture of metal, sand, ashes, oxides etc. This mixture is supplied, via the suction line 7a, FIG. 3, into a tubular separator 16 of known type. All particles larger than .2 mm. are removed, and all other particles and the specifically light particles are passed on by the air current produced by the fan 24. From the separator 16, which is a conventional inclined sifter, the particles larger than .2 mm. so-called grit pass through a discharge valve 16a which closes the air current and to two drum magnets 18 arranged in series in the housing 17. Non-magnetic particles drop into the container 19 while iron and ferrous particles drop into container 20. The grit collected in container 19 can again be melted.

The material sucked from the separator 16 by the air current passes through the cyclone 21, grain sizes of approximately .05 to .2 mm. being removed. The remaining fine dust is separated from the air by the dust filter 23 and the air emerges free from dust through exhaust channel 25.

The dust removed by the cyclone and the dust filter is practically free from metal and may be employed for other purposes. However when said dust contains oxides they may be made available for reuse through a reduction process.

*Example I*

1000 kg. of crude aluminium dross, resulting from a melting operation were processed in accordance with the invention. After subjecting the crude dross to a beating action in which the dross was crushed into particles. 550 kg. of dross in particles of a size larger than 1 mm. were obtained which were ready for melting. After melting of this quantity of dross 420 kg. of industrial aluminium resulted.

The remaining 450 kg. of dross having a particle size of 1 mm. and less were subjected to air separation in which 180 kg. of grit having particle sizes between .2 mm. and 1 mm. were removed from the air flow. This 180 kg. of grit were than equally subjected to a melting process in which an additional 80 kg. of industrial aluminium were obtained.

A quantity of 270 kg. of dust resulted from air separation which was then subjected to a further separating operation in 230 kg. of large grain dust in sizes ranging between .05 and .2 mm. were removed. On the other hand 40 kg. of small grain dust in sizes below .05 mm. were separated from the air by filtering the latter. Large grain and small grain dust were then available for further use such as a reducing operation.

It will be seen that due to the separation of the grit a total of 500 kg. of industrial aluminium was available which corresponds to a yield of 50% with respect to the quantity of crude dross processed.

The full process excluding melting was carried out in 15 minutes.

*Example II*

1000 kg. of crude zinc dross, resulting from a melting operation were processed in accordance with the invention. The crude dross was subjected to a beating operation for crushing the latter into particles. The particles above 1 mm. were then removed and collected from melting and it was found that 700 kg. had been obtained. After melting of this amount 560 kg. of industrial zinc resulted.

The remaining 300 kg. of dross in particle sizes of 1 mm. and less were subjected to air separation in which 190 kg. of grit having particle sizes between .2 and 1 mm. were removed from the air flow. The grit was then equally melted and an additional 160 kg. of industrial zinc were obtained.

From the air separation 110 kg. of dust resulted which were subjected to further processing as in Example I. This dust was after being so processed, sold to a zinc producing plant.

Through the separation of grit from the air, which as mentioned above resulted in an additional 160 kg. of zinc a total of 720 kg. of industrial zinc was obtained corresponding to a yield of 72% of the crude zinc dross processed.

The operation was carried out in approximately 10 minutes. It has been found that the plant in accordance with the invention is capable of processing an amount of crude dross per time unit which depending on the type of metal is 6 to 8 times larger than that processed with conventional plants at equal operating costs in both cases, while the plant costs were only double those of a conventional plant of the capacity mentioned above.

The increase in output is largely due to the use of a beater or hammer mill instead of an edge or ball mill since it permits continuous operation, i.e. it may be continuously charged with crude dross and it will then continuously deliver the dross crushed into particles.

Such mills seemed unsuitable for crushing because dross contains some solid metalliferous lumps which cannot be crushed further. However, it has been found that lumps of dross are so processed by such hammer mills that layers containing little or no metal are removed to an extent that the remaining portion can rationally be remelted.

The use of a hammer mill instead of an edge or ball mill also prevents excessive crushing of the metal and the ensuing loss of metal.

Various changes and modifications may be made without departing from the spirit and scope of the present invention and it is intended that such obvious changes and modifications be embraced by the annexed claims.

Having thus described the invention, what is claimed as new and desired to be secured by Letters Patent is:

1. A method of processing dross and ashes of non-ferrous metals comprising the steps of feeding dross to a beater mill crushing and breaking said dross into substantially non-pulverized particles, discharging the dross, thereafter removing dross having a grain size of approximately 1 mm. and less, supplying the coarser particles of a grain size of 1 mm. and more by means of a conveyor into a collecting box directly while passing by suction the smaller particles with a grain size of up to approximately 1 mm. across a separator for the removal of grain sizes between .2 and 1 mm., while the balance is separated into grain sizes of approximately .05 to .2 mm. and less by means of a cyclone, and then collecting the last dust of sizes under .05 mm. by a fine filter.

2. The method of mechanically processing the dross of non-ferrous metals comprising the steps of continuously feeding said dross to a first station, subjecting said dross to a beating action at said first station to thereby crush said dross into substantially non-pulverized particles, sieving said particles at a second station to separate therefrom smaller particles below 1 mm. size, continuously conveying larger particles of and above 1 mm. size from said second to a third station to collect said larger particles, entraining said smaller particles in an air flow at said second station and transporting said smaller particles to a fourth station, separating substantially all metallic particles from said smaller particles in said air flow at said fourth station and collecting said separated metallic particles at a fifth station, whereby said particles continuously collected at said third and fifth stations are made available for reuse in melting.

3. An installation for the processing of dross of non-ferrous metals, comprising the combination of a beater mill, means for positively separating larger from smaller particles of dross disposed directly beneath said mill and fed from said mill by gravity, a conveyor for the removal of the larger particles separated by said means, said conveyor being fed by said means and disposed adjacent thereto, an air pipe connected to said means for removal of the smaller particles, a separator for removing metallic particles from said smaller particles arranged in said air pipe, a cyclone separator connected to the outlet side of said air pipe, and a filter serially connected to the outlet of said cyclone separator for filtering dust from air passing beyond said cyclone separator.

4. The installation of claim 3 wherein said conveyor is provided with first magnetic means for separating the ferrous materials from non-ferrous materials among said larger particles, and second magnetic means below said separator for separating the ferrous materials from non-ferrous materials among said smaller particles.

References Cited in the file of this patent

UNITED STATES PATENTS

| 1,665,806 | Bing | Apr. 10, 1928 |
| 1,797,597 | Ulrich | Mar. 24, 1931 |
| 1,934,410 | Cummins | Nov. 7, 1933 |
| 2,236,548 | Prouty | Apr. 1, 1941 |
| 2,354,312 | Harlow | July 25, 1944 |
| 2,420,540 | Hubbell | May 13, 1947 |
| 2,461,089 | Smidth | Feb. 8, 1949 |
| 2,713,977 | Boll | July 26, 1955 |
| 2,879,005 | Jarvis | Mar. 24, 1959 |
| 2,962,231 | Weston | Nov. 29, 1960 |

FOREIGN PATENTS

| 590,424 | France | Mar. 18, 1925 |